Oct. 13, 1925.
J. W. CRAIG
1,556,916
APPARATUS FOR PROMOTING FUEL COMBUSTION
Original Filed Dec. 21, 1922   2 Sheets-Sheet 1
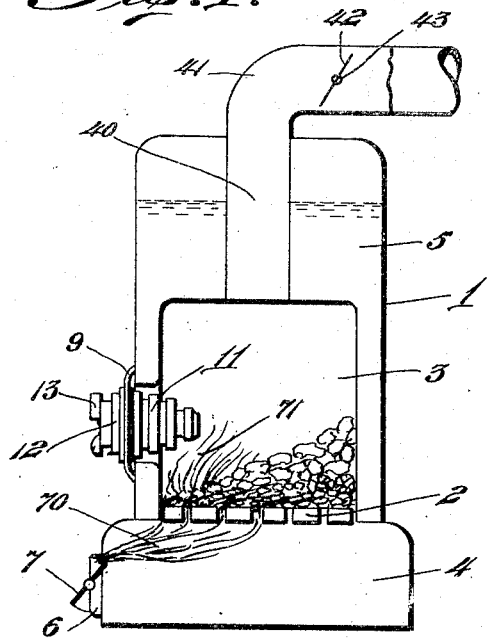
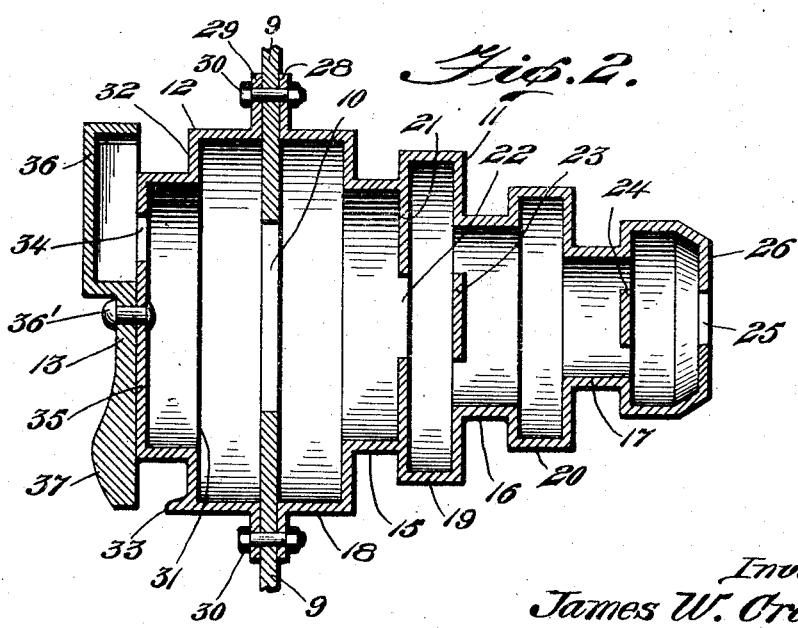
Inventor
James W. Craig
By Perley H. Plant
Attorney

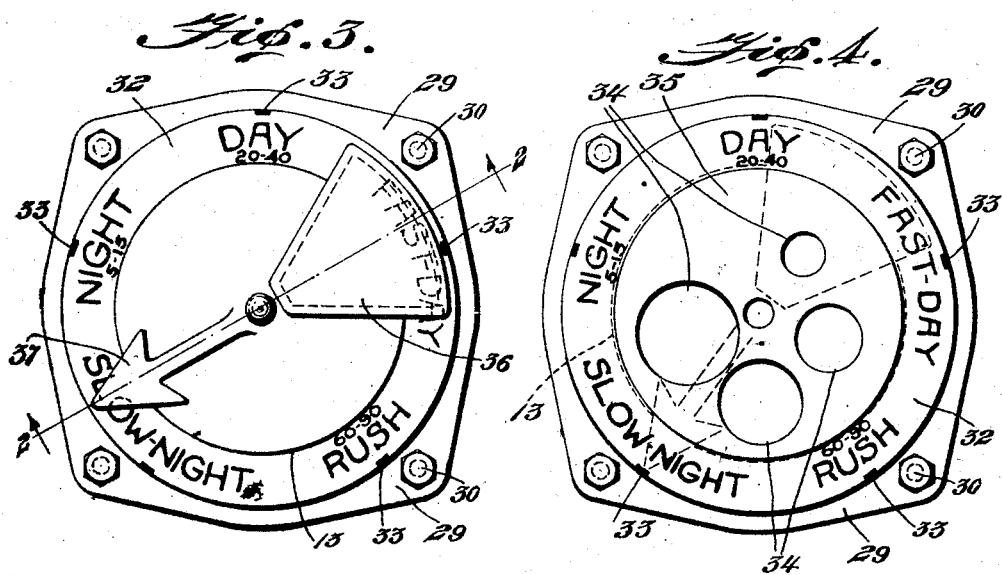

Patented Oct. 13, 1925.

1,556,916

UNITED STATES PATENT OFFICE.

JAMES W. CRAIG, OF PROVIDENCE, RHODE ISLAND.

APPARATUS FOR PROMOTING FUEL COMBUSTION.

Original application filed December 21, 1922, Serial No. 608,225. Divided and this application filed May 2, 1924. Serial No. 710,552.

*To all whom it may concern:*

Be it known that I, JAMES W. CRAIG, a citizen of the United States, residing at Providence, in the county of Providence and State of Rhode Island, have invented certain new and useful Improvements in Apparatus for Promoting Fuel Combustion, of which the following is a specification.

This invention relates to an improved method and apparatus for increasing efficiency of fuel combustion whereby a more complete combustion of the carbon containing elements of the fuel is effected than by methods now in use and the calorific effect of the fuel enhanced.

One object of the invention is to provide an improved method of operation whereby the discharge of the incompletely burned gases from the fuel is localized and immediately upon their discharge from the fuel they are contacted with preheated air to effect substantially complete union between the oxygen of the air and the carbon of the gases thus resulting in the maximum output of heat energy from the fuel.

A further object of the invention is the provision of a novel method for controlling the supply of air to a combustion chamber and the proper regulation of the supply above and below the fuel, as well as the coordinate control of the flow of exit gases from the combustion chamber whereby the conservation of the fuel is most efficiently controlled and the maximum heat energy utilized.

Another object of the invention is the provision of a novel means for controlling and preheating the supply of air admitted to the combustion chamber.

Other objects and advantages of the invention relate to improved details of construction and methods of operation as well as the novel arrangement of the elements involved as will be more fully set forth in the detailed description to follow.

Referring to the accompanying drawings:

Fig. 1 is a diagrammatic sectional view of a furnace illustrating the relative positions of the several elements as well as the direction of flow of the gases during combustion.

Fig. 2 is a vertical sectional view through the door of the furnace and preheater structure, through which a regulated quantity of air is admitted to the combustion chamber.

Fig. 3 is a front elevational view of the inlet mechanism for admitting air to the combustion chamber.

Fig. 4 is a view similar to Fig. 3 with the shutter removed, its position being indicated in dotted lines.

In the embodiment of the invention illustrated herewith 1 designates generally the furnace which has a grate 2, a combustion chamber 3, an ash chamber 4 positioned below the combustion chamber and a water reservoir 5 substantially surrounding the combustion chamber. A door 6 serves as a closure for the ash chamber 4 and is provided with the usual inlet control 7 for admitting air beneath the grate 2.

A door 9 serves as a closure for the combustion chamber 3 and is provided with an opening 10 for admitting air to the combustion chamber through a preheater 11 secured to the inner side of the door and projecting into the combustion chamber. An inlet controlling device 12, comprising a shutter 13, is secured to the outer surface of the door 9 for controlling the supply of air admitted to the combustion chamber through the preheater.

The preheater 11 comprises a series of concentrically arranged inwardly projecting circular shoulders of gradually decreasing size indicated by reference characters 15, 16 and 17, separated from each other and from the door 9 by outwardly extending circular sections 18, 19 and 20. From the circular shoulder 15 baffle plates 21 extend inwardly partially across the interior of the preheater but separated from each other sufficiently to provide a restricted opening 22. Baffles 23 and 24 are positioned within the preheater rearwardly of the opening 22, and an opening 25 in the inner reduced end 26 of the preheater admits air from the preheater to the combustion chamber after the air has been heated by passing through the tortuous passages of the preheater and contacting with the heated surfaces thereof. The preheater 11 and air inlet device 12 are provided with outwardly extending flanges 28 and 29 respectively, contacting with the door 9, to which they may be secured by suitable fastening devices 30 passed through the flanges and door.

The air inlet controlling means includes the member 31 secured to the front surface of the door 9 which is provided with an annular shoulder 32 bearing indicia such as "Night," "Day," "Rush," etc. together with other associated indicia correspondingly related to the above as "5—15," "20—40" and "60—90," etc. The indicia being so displayed as to be readily seen from the front of the inlet controlling mechanism. The above described indicia designating different periods of operation may be appropriately spaced about the circumferential extent of the shoulder 32 and bosses 33 may be suitably positioned relative to each legend for designating the proper position of the shutter to correspond with the desired adjustment. A plurality of openings 34 of varying size are formed in the outer face 35 of the member 31 and the shutter 13 is pivotally mounted in contact with the face 35 by means of a suitable pivot pin 36.' The shutter 13 is of circular shape as shown in Figs. 3 and 4, and is, throughout the major portion of its extent, of substantially the same size as the face portion 35 of the member 31, against which it bears to serve as a closure for the openings 34 formed therein, except as one or the other of these openings may be placed in communication with the combustion chamber by suitably moving the shutter. The shutter is provided with an enlarged hollowed out portion 36 extending somewhat beyond the face 35 of the member 31 and of sufficient lateral extent to substantially cover either of the openings 34 whereby each of these openings may be opened to communication with the exterior of the furnace, or, if desired, the portion 36 of the shutter may be placed over that portion of the face 35 which is without openings and thus all communication with the combustion chamber through the preheater cut off. An indicating arrow 37 carried by the shutter is adapted to point to the boss associated with the corresponding indicia when the enlarged portion 36 of the shutter is placed over either of the openings or over that portion of the face 35 which is unprovided with an opening.

A flue 40 extends upwardly from the combustion chamber 3 of the furnace and communicates with a pipe 41 through which the exit gases pass from the combustion chamber. A damper 42 is positioned in the pipe 41 and rotatably supported by a rod 43 for movement to vary the quantity of exit gases passing through the pipe.

In carrying out my improved method of operation, the fuel is preferably arranged upon the grate 2 in areas of varying depth increasing from front to rear as shown in Fig. 1 of the drawings whereby more rapid combustion of the fuel takes place in the front areas than in the back areas of the fuel and as air is admitted beneath the fuel, as indicated at 70, the carbon containing gases escaping from the fuel fail to penetrate the thicker portions of the fuel at the rear of the grate as readily as the thinner portions at the front thereof thus tending to direct the partially unburned gases towards the front of the chamber as indicated at 71 where they immediately contact with the preheater 11 and receive therefrom heated air which is mixed with the gases and in circulating therewith contacts with the highly heated gases in the chamber to effect more complete union between the oxygen content of the air and the carbon carried by the gases. When combustion of the fuel is under way the air intake 7 at the base of the furnace is closed or substantially closed to prevent access of cold air beneath the fuel while air may be admitted through the preheater 11 in excess or in adjusted relation to the air admitted below the fuel to effect as fully as possible the complete burning of the fuel gases. At the same time the draft regulating means in the pipe 41 is set to decrease the flow of the hot exit gases from the fuel chamber and subject the same to continued contact with the burning gases in the chamber and increase the combustion of the gases. In thus regulating the quantity of air admitted above the fuel relatively to the flow of gases from the combustion chamber I set the shutter 13 so that the arrow 37 points to the desired indicia, as, for example, "Night" on the annular shoulder 32, which places next to the smallest opening 34 in communication with the preheater, and at the same time set the pointer carried by the damper 42 at an appropriate position on a scale provided therefor, the proper combination of openings in the face 35 with the positioning of the damper as indicated by means of the pointer and scale being determined according to a prearranged plan of operation, and the proper association of the indicia on the shoulder 31 and scale being expressed directly as shown in Fig. 3 or indicated by means of printed directions or otherwise.

While I have shown and described with considerable particularity one form which my invention may assume in practice, I am aware that various changes in the form and arrangement of the parts may be made by one skilled in the art, and I do not desire, therefore, that the descriptive matter herein contained be understood as limiting my invention to the precise form shown and described but it is my intention that the description of the method of positioning and arranging the various parts be regarded as illustrative rather than in a limiting sense.

This application is a division of my application Serial No. 608,225, filed in the United States Patent Office December 21, 1922.

What I claim is:—

1. An apparatus for promoting fuel combustion which comprises, a combustion chamber, a preheater projecting within said combustion chamber for admitting air thereto, an air inlet mechanism for admitting unpreheated air directly to said preheater comprising a plate provided with a series of openings of varying size and having indicia located thereon correspondingly positioned relative to the several openings, and a movable shutter overlying said openings and serving as a closure therefor said shutter being provided upon the side adjacent to said openings with a segmental recess forming an air passage for selectively placing each of said openings separately in communication with a supply of unpreheated air and having means for designating the indicia corresponding with the opening thus placed in communication with the air supply.

2. An apparatus for promoting fuel combustion which comprises, a combustion chamber, a door serving as a closure for said combustion chamber and provided with an opening therein, a preheater secured to said door and having a portion thereof projecting within said combustion chamber and one face thereof located outwardly of said door, said preheater being provided upon its outer face with a series of openings of varying size and having indicia located thereon correspondingly positioned relative to the several openings, and a shutter movably secured to the outer face of said preheater and overlying said openings, said shutter being provided upon the side adjacent to said openings with a recess adapted to serve as an air passage and being selectively movable to place each of the openings in the outer face of said preheater separately into communication with a supply of unpreheated air through said recessed air passage, said shutter being also movable to close all of the openings in the outer face of said preheater and having means for designating the indicia indicating the position of the said openings relative to the said air passage.

3. An apparatus for promoting full combustion which comprises, a combustion chamber, a door serving as a closure for said combustion chamber and provided with an opening therein, a preheater secured to said door and having a portion thereof projecting within said combustion chamber, and one face thereof located outwardly of said door, said preheater being provided with a plurality of spaced chambers connected by relatively narrow neck portions, baffles carried by said neck portions, certain of said baffles being arranged in staggered relation, said preheater being also provided upon its outer face with a series of openings of varying size and having indicia located thereon correspondingly positioned relative to the several openings, and a shutter movably secured to the outer face of said preheater and overlying said openings, said shutter being provided upon the side adjacent to said openings with a recess adapted to serve as an air passage and being selectively movable to place each of the openings in the outer face of said preheater separately into communication with a supply of unpreheated air through said recessed air passage and having means for designating the indicia indicating the position of said openings relative to said air passage.

In testimony whereof I have affixed my signature.

JAMES W. CRAIG.